United States Patent
Svec (10) Patent No.: US 11,428,915 B2
(45) Date of Patent: Aug. 30, 2022

(54) COMPACT, SIMULTANEOUS DUAL FIELD OF VIEW THROUGH A COMMON APERTURE

(71) Applicant: Christopher B. Svec, Palatine, IL (US)

(72) Inventor: Christopher B. Svec, Palatine, IL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 186 days.

(21) Appl. No.: 16/866,290

(22) Filed: May 4, 2020

(65) Prior Publication Data
US 2020/0264414 A1 Aug. 20, 2020

Related U.S. Application Data

(62) Division of application No. 15/289,593, filed on Oct. 10, 2016, now Pat. No. 10,678,035.

(51) Int. Cl.
*G02B 17/08* (2006.01)
*G02B 1/10* (2015.01)

(52) U.S. Cl.
CPC ....... *G02B 17/0896* (2013.01); *G02B 17/086* (2013.01); *G02B 17/0808* (2013.01); *G02B 1/10* (2013.01)

(58) Field of Classification Search
CPC ............ G02B 17/0896; G02B 17/0808; G02B 17/086; G02B 1/10
See application file for complete search history.

(56) References Cited

U.S. PATENT DOCUMENTS

| | | |
|---|---|---|
| 2,923,202 A | 2/1960 | Trimble |
| 3,326,621 A | 6/1967 | Berggren De Nygorden |
| 4,354,742 A | 10/1982 | Abel et al. |
| 4,453,800 A | 6/1984 | Fjeldsted |
| 4,877,317 A | 10/1989 | Gibbons et al. |
| 4,950,056 A | 8/1990 | Smith |
| 5,113,281 A | 5/1992 | Mandelboum et al. |
| 5,161,051 A | 11/1992 | Whitney et al. |

(Continued)

FOREIGN PATENT DOCUMENTS

| | | |
|---|---|---|
| CN | 106443994 A | 2/2017 |
| EP | 0128815 A2 | 12/1984 |

(Continued)

OTHER PUBLICATIONS

Tremblay, "Concentric multi-reflection lenses for ultra-compact imaging systems", UC San Diego Electronic theses and Dissertations, Permalink: http://escholarship.org/uc/item/1w2v3k0, 2008.

*Primary Examiner* — Robert E. Tallman
(74) *Attorney, Agent, or Firm* — Tarolli, Sundheim, Covell & Tummino LLP (57) ABSTRACT

A compact, uniaxially-aligned series of lenses are shaped and coated to allow coaxial viewing of two different fields of view on the same focal-plane array by selecting a type of light. The selection can be, for example, by spectrum or polarization. Zonal coatings on the lens surfaces permit for a catadioptric narrow field-of-view light path. The lens assembly accomplishes simultaneous dual field-of-view in a durable package without respective motion of optical elements, without substantial gaps between the lenses, and at lower cost than other assemblies.

20 Claims, 3 Drawing Sheets

(56) References Cited

U.S. PATENT DOCUMENTS

| | | | |
|---|---|---|---|
| 5,181,145 A | 1/1993 | Eden | |
| 5,751,473 A | 5/1998 | Runciman | |
| 5,953,155 A | 9/1999 | Eckel, Jr. et al. | |
| 5,969,860 A | 10/1999 | Mearns | |
| 6,118,583 A | 9/2000 | Rogers | |
| 6,294,808 B1 | 9/2001 | Yu et al. | |
| 6,765,719 B2 | 7/2004 | Lundgren | |
| 6,870,684 B2 | 3/2005 | Beatson et al. | |
| 7,297,951 B2 | 11/2007 | Chen et al. | |
| 7,486,438 B2 | 2/2009 | Bergeron et al. | |
| 7,573,654 B2 | 8/2009 | Bietry et al. | |
| 8,563,929 B2 | 10/2013 | Vizgaitis | |
| 8,836,794 B2 | 9/2014 | Vizgaitis | |
| 9,025,256 B2 | 5/2015 | Cook | |
| 9,200,966 B2 | 12/2015 | Wright et al. | |
| 9,826,153 B2 * | 11/2017 | Pixton | G02B 17/0652 |
| 2011/0051229 A1 | 3/2011 | Alexay | |
| 2011/0134249 A1 * | 6/2011 | Wood | G02B 26/101 |
| | | | 348/164 |
| 2012/0229914 A1 * | 9/2012 | Cook | G02B 13/14 |
| | | | 359/689 |
| 2013/0155399 A9 | 6/2013 | Hwang et al. | |

FOREIGN PATENT DOCUMENTS

| | | |
|---|---|---|
| GB | 2212936 A | 8/1989 |
| WO | 2007015236 A1 | 2/2007 |

\* cited by examiner

COMPACT, SIMULTANEOUS DUAL FIELD OF VIEW THROUGH A COMMON APERTURE

RELATED APPLICATIONS

This application is a divisional application of co-pending U.S. patent application Ser. No. 15/289,593, filed 10 Oct. 2016, which is incorporated herein in its entirety.

TECHNICAL FIELD

The present disclosure relates to optics, and in particular to compact, simultaneous dual field of view through a common aperture.

BACKGROUND

Many optical systems require a wide field of view, to search a large area quickly, and a narrow field of view, to provide detailed information on an item of interest. Previous methods of achieving this dual field-of-view (FOV) capability have involved complex and space-intensive multi-element optical assemblies that are complex to design and manufacture. Low-cost, space-limited applications previously had not been able to incorporate dual-field-of-view capability.

Dual FOV systems provide both a wide field of view and a narrow, or magnified, field of view of the same perspective. Typical examples of non-simultaneous dual FOV systems are the optical zoom lens assemblies found in consumer video camera systems. Such systems work by moving lens components with respect to one another to transition between minimum and maximum FOV extents, termed "wide" and "zoom," respectively. Such implementations involving moving lens components are bulky, expensive, and can be prone to damage, as from shock-induced misalignment of optical components, or failure of servomotors used to reposition the optical elements with respect to each other. Such switched-FOV systems are also unable to provide both fields of view simultaneously since they require the movement of lenses to switch between fields of view. Other dual FOV optical assemblies eliminate the requirement for moving lenses, but still involve substantial gaps between the optical components, and are thus similarly bulky, expensive, and fragile.

Systems employing what is known as "digital zoom," which relies on image processing techniques to digitally create a narrow field of view from an image acquired from a wide field of view, can exhibit image degradation in the digitally enhanced narrow-field-of-view images, such as pixilation, enhancement algorithm artifacting, and noise. Digital zoom systems are thus frequently inadequate for many applications.

SUMMARY

In one example, there is provided a lens assembly comprising at least three optical elements forming at least six optical surfaces configured to simultaneously refract or reflect light from at least a first light path corresponding to a wide field of view and a second light path corresponding to a narrow field of view, the three optical elements being arranged such that the first light path refractively transmits through each of the surfaces, while the second light path transmits through a first surface, a second surface, and a third surface, catadioptrically reflects off a fourth surface, reflects off the third surface, transmits through the fourth surface and a fifth surface, and transmits through a sixth surface.

In another example, there is provided an optical triplet comprising three lenses arranged uniaxially, the space between each lens being less than the width of any of the lenses, wherein the optical triplet simultaneously outputs two different fields of view selectable by type of light.

In another example, there is provided a uni-axial simultaneous dual field-of-view lens assembly providing two different fields of view of the same perspective, a wide field of view and a narrow field of view, the assembly comprising at least three optical elements forming at least six optical surfaces configured to simultaneously refract or reflect light from at least a first light path corresponding to a wide field of view and a second light path corresponding to a narrow field of view, the three optical elements being arranged such that the first light path refractively transmits through each of the surfaces, while the second light path transmits through a first surface, a second surface, and a third surface, catadioptrically reflects off a fourth surface, reflects off the third surface, transmits through the fourth surface and a fifth surface, and transmits through a sixth surface, in that order.

In another example, there is provided a dual field-of-view method for simultaneously providing a wide field of view and a narrow field of view of the same perspective, comprising transmitting light corresponding to a wide field of view along a first light path through at least three optical elements, and simultaneously transmitting light corresponding to a narrow field of view along a second light path through a first surface on one side of a first of the at least three optical elements, through a second surface on an opposite side of the first of the at least three optical elements, and through a third surface on one side of a second of the at least three optical elements, catadioptrically reflecting the light corresponding to the narrow field of view off a fourth surface on an opposite side of the second of the at least three optical elements, reflecting the light corresponding to the narrow field of view off the third surface, transmitting the light corresponding to the narrow field of view through the fourth surface and through a fifth surface on one side of a third of the at least three optical elements, and transmitting the light corresponding to the narrow field of view through a sixth surface on an opposite side of the third of the at least three optical elements, in that order, so as to simultaneously provide a wide field of view and a narrow field of view of the same perspective.

In another example, there is provided a lens assembly simultaneously providing two different fields of view of the same perspective, the assembly comprising at least three uniaxially-arranged optical elements forming at least six optical surfaces configured to simultaneously refract or reflect light from at least a first light path corresponding to a wide field of view and a second light path corresponding to a narrow field of view, wherein a first optical element comprises a first surface coated in a central region with a first coating transmissive of the first light path and reflective of the second light path and coated in an annular outer region with a second coating transmissive of the second light path and reflective of the first light path, and a second surface transmissive of both the first light path and the second light path, a second optical element comprises a third surface coated in a central region with the first coating and not coated with the first coating in an annular outer region, and a fourth surface coated in an annular outer region with the first coating and not coated with the first coating in a central region, and a third optical element comprises a fifth surface, and a sixth surface coated in a central region with the second coating and not coated with the second coating in an annular outer region.

In another example, there is provided a uni-axial simultaneous dual field-of-view lens assembly providing two different fields of view of the same perspective, a wide field of view and a narrow field of view, the assembly comprising at least three optical elements forming at least six optical surfaces configured to simultaneously refract or reflect light from at least a first light path corresponding to a wide field of view and a second light path corresponding to a narrow field of view. The first optical element comprise a first surface coated in a central region with a first coating transmissive of the first light path and reflective of the second light path, and coated in an annular outer region with a second coating transmissive of the second light path and reflective of the first light path. The first optical element further comprises a second surface coated in a third coating transmissive of both the first light path and the second light path. A second optical element comprises a third surface coated in a central region with the first coating and coated in an annular outer region with the third coating, and a fourth surface coated in a central region with the third coating and in an annular outer region with the first coating. A third optical element comprises a fifth surface coated with the third coating, and a sixth surface coated in a central region with the second coating and in an annular outer region with the third coating.

DETAILED DESCRIPTION

A compact, uniaxially-aligned series of lenses are shaped and coated to allow coaxial viewing of two different fields of view on the same focal-plane array by selecting a type of light. The selection can be, for example, by spectrum or polarization. The described lens assembly accomplishes dual FOV in a compact and low-cost package. No respective motion of optical elements is needed to achieve the dual field of view. The compact and static assembly makes the described assembly less complex compared to prior solutions. Moreover, because it is compact and static, the provided assembly is more rugged and durable, and less prone to shock damage that can cause misalignment of optical elements. The elimination of mechanical motion allows for more rapid automatic image processing or human comprehension of output images.

Resultantly, the present disclosure provides simultaneous dual FOV systems that do not involve moving lenses, do not require many optical elements, do not occupy large volumes incurred by substantial air gaps between optical elements, and do not rely solely or primarily on "digital zoom" image enhancement techniques to provide image magnification.

Such features are useful in systems that need to switch from a wide/acquisition field of view to a narrow/tracking field or to perform processing from the two fields simultaneously. Example applications include autonomous road vehicle systems, field optics and viewing systems, military and weapons systems, industrial visual inspection and quality-control systems, and aerial or underwater vehicle systems, whether unpiloted or piloted.

Figure 1:
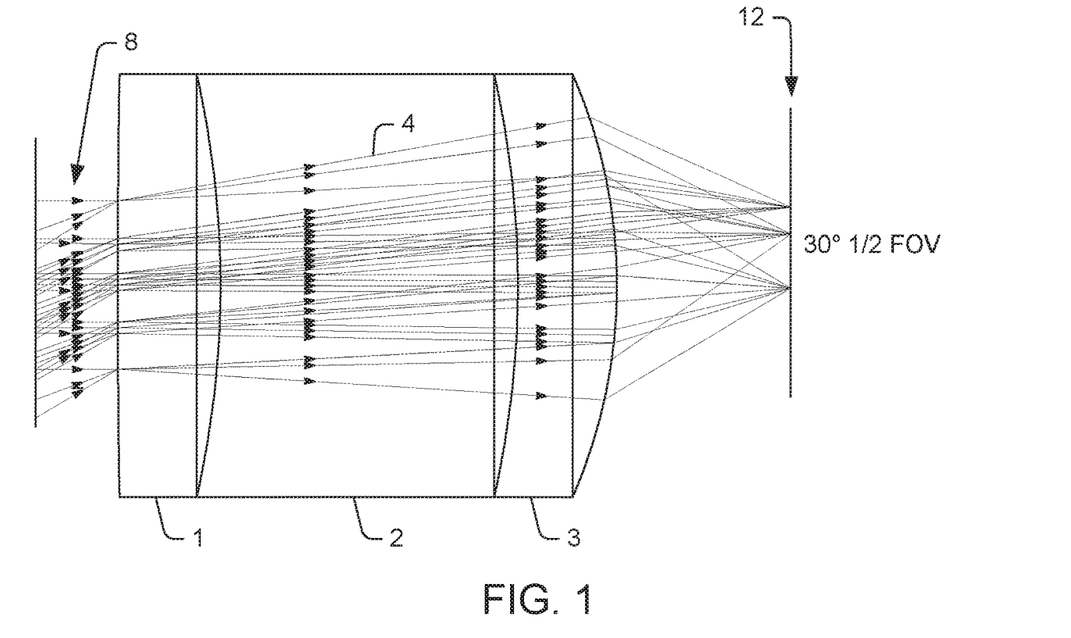
FIG. 1 illustrates an example of a lens assembly providing refractively transmitted wide field-of-view light path.
Figure 2:
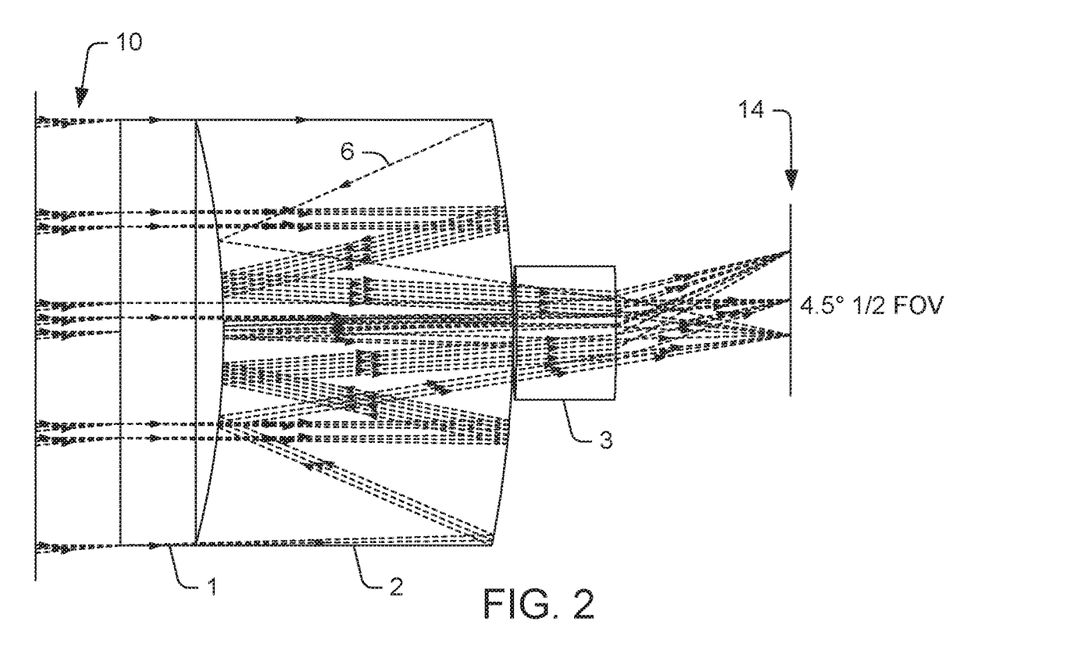
FIG. 2 illustrates an example of a lens assembly providing a catadioptrically reflected narrow field-of-view light path.
Figure 3:
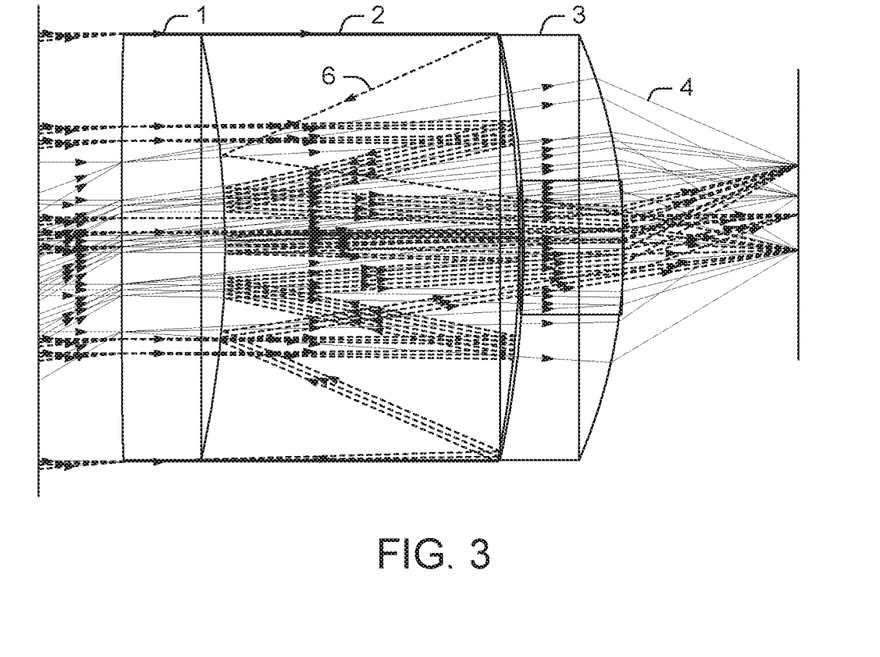
FIG. 3 illustrates an example of a lens assembly simultaneously and uniaxially providing both a refractively transmitted wide field-of-view light path and a catadioptrically reflected narrow field-of-view light path.
Figure 4:
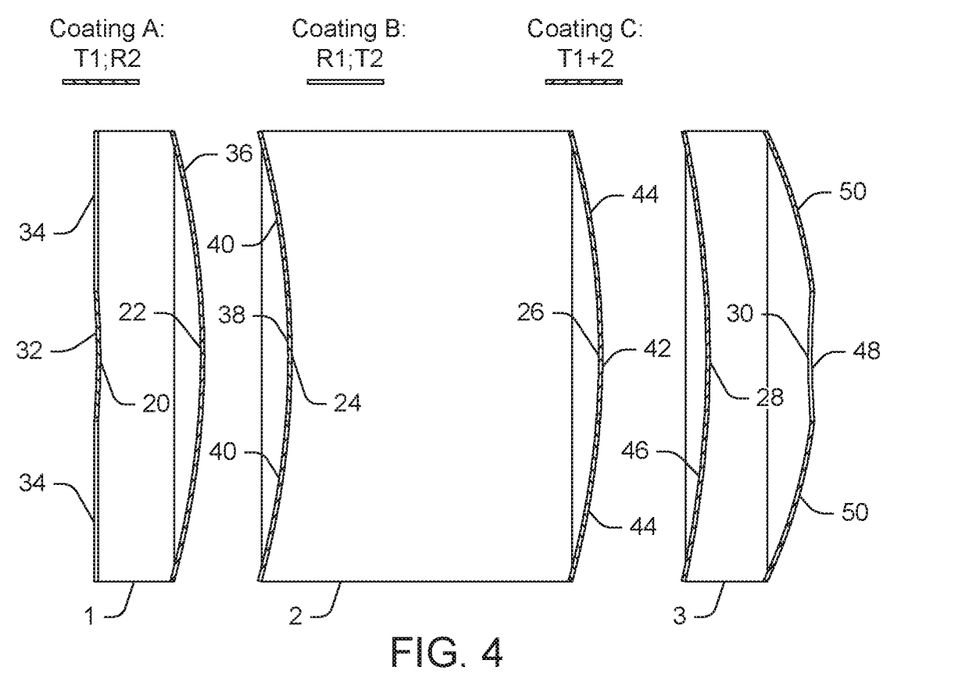
FIG. 4 illustrates an example of zonally coated optical elements that may be used to provide the lens assembly of FIG. 3.

FIGS. 1-4 are illustrative of an example simultaneous dual field-of-view system that does not require movement of optical elements and eliminates substantial gaps between the elements. FIG. 4 separates the optical elements from each other for illustrative purposes only. In practice, there are no substantial gaps between the elements, as shown in FIGS. 1-3. By "substantial gaps", it is meant that each of the spaces between each of all of the optical elements, including lenses, is less than the widths of the optical elements themselves. For example, each of the gap distances is less than $\frac{1}{25}^{th}$ of the width of the optical elements. For example, less than $\frac{1}{50}^{th}$. For example, less than $\frac{1}{100}$. For example, the gap distances are each less than 10 millimeters. For example, less than 2 millimeters. For example, less than 1 millimeter. For example, there is essentially no gap and the optical elements are in physical contact with each other. Although FIGS. 1-3 do not show gaps between the elements 1, 2, 3, it will be appreciated that in practice there may be some very minute gaps between the elements 1, 2, 3.

The system shown in FIGS. 1-4 comprises three lenses 1, 2, 3 in close proximity to each other, as in an optical triplet. As shown best in FIG. 4, each surface is coated in different zones to allow transmission or reflection of two different types of light, referred to herein as "light paths," which can be discriminated either by spectrum or by polarization. A "light path" herein comprises all of the optical rays that make up one particular field of view, either wide or magnified (narrow). Thus, FIG. 1 shows a single light path, FIG. 2 shows a single light path, and FIG. 3 illustrates two light paths.

Thus it can be seen in FIGS. 1-3 that the system establishes two distinct paths: one, an all-refractive wide field-of-view (WFOV) path 4, and two, a catadioptric narrow field of view (NFOV) path 6. The two paths are transmitted simultaneously through the assembly comprising a uniaxial optical triplet without substantial gaps between the optical elements, at least some of the surfaces being coated in annularly arranged zones to provide the desired transmission or reflectance of the rays of the selectably distinct light paths.

In the illustrated example, light rays 8, 10 reflected from a viewing subject enter the first optical element 1 from the left side of the drawings and exit on the right side of the drawings, where they may focus on output planes 12, 14. Output planes 12, 14 may be one and the same plane or may be slightly separated from each other in the longitudinal direction. At the location of the output planes 12, 14 may be any type of image sensor or medium for transducing or displaying the image. For example, the illustrated lens assembly may be cooperatively coupled to a charge coupled device (CCD) imaging sensor, a CMOS active-pixel sensor, a stacked-photodiode photosite array sensor (e.g., FOVEON X3), or any other appropriate imaging sensor.

FIG. 1 illustrates only the wide field-of-view (WFOV) light path 4, i.e., only those rays 8 that make up the WFOV image, as it passes through the three optical elements 1, 2, 3. The optical elements 1, 2, 3 can be numbered in the order that light passes through them (e.g., first lens 1, second lens 2, third lens 3) or can be named with reference to their proximity to the imaging plane (e.g., outer lens 1, middle lens 2, inner lens 3). The WFOV light path 4 passes through all of the lenses—outer 1, then middle 2, then inner 3—refractively, with no substantial amount of light in the WFOV light path 4 reflected within or back out of the assembly. The curvatures and coatings of the surfaces of the lens elements are such that, in the illustrated example, a 30° half-field-of-view (½FOV) angle is produced at the output plane 12 on the right side of FIG. 1.

FIG. 2 illustrates only the narrow field-of-view (NFOV) light path 6, i.e., only those rays 10 that make up the NFOV image, as it passes through the three optical elements 1, 2, 3. For purposes of illustration, the outer annular portion of the leftmost optical element 3 (i.e., the "third" or "inner" optical element 3) has been omitted from the drawing. The path of the NFOV light 6 is more complex than the path of the WFOV light 4, since its interaction with the lens surfaces is not simple refractive transmission, but instead depends on the zonal coatings of the optical elements 1, 2, 3. Each lens element is said to have two surfaces (the rim or edge surface(s) being ignored for the purposes of the description, since they do not serve an optical function here). Thus, for three elements, there are six surfaces, which can be numbered from left to right (first through sixth) or named with reference to their proximity to the imaging plane (outer versus inner). As such, an "inner" or "outer" surface is not "inner" or "outer" with respect to its internality or externality to the element, but rather with respect to the arrangement of elements. Alternatively, the surfaces can be termed according to their function in the "signal path" of the light. Thus, for example, an outer surface (more proximal to a viewing subject) can be termed an input surface and an inner surface (more proximal to a detector assembly or imaging sensor) can be termed an output surface. In each of the following paragraphs, the direction of travel of the NFOV light path 6, from "outer" to "inner" or from "input" to "output", is from left to right on the drawing, except where otherwise noted and due to reflection inside the lens assembly.

First, the NFOV light path 6 passes through a first surface 20 on one side of the first optical element 1. Another way of saying this is that the NFOV light path 6 passes through the outside surface 20 of the outside lens 1. Second, the NFOV light path 6 passes through a second surface 22 on the opposite side of the first optical element 1. Another way of saying this is that the NFOV light path 6 passes through the inside surface 22 of the outside lens 1. Third, the NFOV light path 6 passes through a third surface 24 on one side of the second optical element 2. Another way of saying this is that the NFOV light path 6 passes through the outside surface 24 of the middle lens 2.

Fourth, the NFOV light path 6 catadioptrically reflects off a fourth surface 26 on an opposite side of the second optical element 2. Another way of saying this is that the NFOV light path 6 catadioptrically reflects off the inner surface 26 of the middle lens 2. At this point, after the reflection, the direction of travel of the NFOV light path 6 is from right to left on the drawing. Fifth, the NFOV light path 6 reflects off the third surface 24. Another way of saying this is that the NFOV light path 6 reflects off the outer surface 24 of the middle lens 2. Again, the term "outer" is used with respect to the lens's orientation and placement.

Sixth, the NFOV light path 6 transmits through the fourth surface 26. Another way of saying this is that the NFOV light path 6 transmits through the inner surface 26 of the middle lens 2. Although the NFOV light path previously reflected off of this surface 26, the transmission in this step is possible because of the zonal coating 42, 44 on the fourth surface 26. The previous reflection was off an annular zone 44 of the surface whereas the transmission is through a differently coated central zone 42 of the surface. Seventh, the NFOV light path 6 transmits through a fifth surface 28 on one side of the third optical element 3. Another way of saying this is that the NFOV light path transmits through the outer surface 28 of the inner lens 3.

Eighth, the NFOV light path 6 transmits through a sixth surface 30 on the opposite side of the third optical element 3. Another way of saying this is that the NFOV light path 6 transmits through the inner surface 30 of the inner lens 3. Finally, the NFOV light path 6 can be resolved on an output plane 14. The curvatures and coatings of the surfaces of the lens elements are such that, in the illustrated example, a 4.5° half-field-of-view (½FOV) angle is produced at the output plane 14 on the right side of FIG. 2.

FIG. 3 illustrates, in the same drawing, the light paths of both the WFOV 4 and the NFOV 6 as they pass through the three optical elements 1, 2, 3 of the system. Thus, in effect, FIG. 3 combines FIGS. 1 and 2. Particularly by comparing FIGS. 1 and 2, it can be noted especially from the rays 8, 10 entering the lens assembly on the left sides of FIGS. 1-3 and the resolution of those rays on the imaging plane(s) on the right sides of FIGS. 1-3 that the assembly provides a wide field of view and a narrow field of view of the same perspective. In the illustrated example, there is a 6.7× difference in magnification between the WFOV and the NFOV. In FIGS. 1-3, rays of the WFOV light path 4 are illustrated with solid lines whereas rays of the NFOV light path 6 are illustrated with dashed lines.

A detector assembly (not shown) may be operatively coupled to the above-described lens assembly to make the appropriate FOV selection (spectral, polarization, etc.) and to convert the optical energy to an electronic signal that can, for example, be digitally processed, displayed, and/or used as input to vision systems. Such vision systems can include autonomous or robotic systems, inspection systems, inventory systems, flight navigation or control systems, targeting systems, or other vision-based or image-processing systems. If, for example, spectral selection is used in the lens assembly, a stacked diode type of detector array may be used to convert the optical output of the lens to electronic signals corresponding to the two different field-of-view images. Such a sensor array detects one spectrum on its top layer and another spectrum on its bottom layer. Under such circumstances it may be desirable that the WFOV light path 4 and the NFOV light path 6 resolve on planes 12, 14 that are longitudinally spaces very slightly apart, such space being the distances between the selective layers of the sensor.

FIG. 4 illustrates the zonal placements of three different types of coatings on each of the three optical elements that make up the dual FOV lens system described above with reference to FIGS. 1-3. The coatings are formulated such that they are reflective or transmissive depending upon the type of light, where light can be classified into types based on a variety of properties, for example spectrum or polarization. Thus, for example, where WFOV light is to be discriminated from NFOV light on the basis of spectral characteristics, a particular coating can be, for example, reflective of relatively high-frequency wavelengths but transmissive of light of relatively low-frequency wavelengths, or by contrast, can be transmissive of relatively high-frequency wavelengths but reflective of light of relatively low-frequency wavelengths.

Alternatively, where WFOV light is to be discriminated from NFOV light on the basis of the orientation of propagation polarization, a particular coating can be, for example, reflective of light that is plane-polarized in one direction but transmissive of light that is plane-polarized in an orthogonal direction. A detector assembly would thus achieve the task of separating the fields of view on the output end of the lens assembly. In order to perform the selection, the detector assembly may make use of, for example, alternatively or in addition to the sensor devices already mentioned, prisms, spinning filter wheels, alternating-orientation filters, louvered devices, filter mosaics, and/or digital micromirror devices (DMDs) to separate, distinguish, or select light paths on the output end of the lens assembly.

In FIG. 4, then, a three-coating system provides the zonal coating that can implement the light path behavior described above with reference to FIGS. 1-3. A first coating, herein termed "coating A," transmits light of a first type and reflects light of a second type. A second coating, herein termed "coating B," transmits light of a second type and reflects light of a first type. A third coating, "coating C," transmits light both of the first type and the second type. Again, the "type" can correspond to spectrum, polarization, or any other distinguishing property of the light.

The coatings are distinguished in FIG. 4 by differently oriented hashed markings. In the illustrated example, outer surface 20 of outer lens 1 is coated with coating A in a central zone 32 but coated with coating B in an annular outer zone 34. Inner surface 22 of outer lens 1 is coated with coating C on the entirety of the surface. Outer surface 24 of middle lens 2 is coated with coating A in a central zone 38 but coated with coating C in an annular outer zone 40. Inner surface 26 of middle lens 2 is coated with coating C in a central zone 42 but coated with coating A in an annular outer zone 44. Outer surface 28 of inner lens 3 is coated with coating C on the entirety of the surface. Inner surface 30 of inner lens 3 is coated with coating B in a central zone 48 but coated with coating C in an annular outer zone 50.

Since coating C is transmissive of both types of light, corresponding to light paths of both fields of view, in some examples there may be no actual coating used on the zones shown to be coated with coating C. In other examples coating C may be a basic coating such as a clear coating or a neutral density filter coating.

The use of the zonal coating accomplishes two things. First, it makes the system very compact such that in one incarnation, the total path length is only 1.5 times the aperture of the narrow field of view. Second, the zonal coating keeps the system coaxial, which greatly reduces manufacturing costs and increases boresight stability between the two fields of view.

The interfaces between the zones can be "hard" or "soft," which is to say, the coatings may be formulated and deposited such that one zone may end where another begins with no transition between the two zones (a "hard" interface) or the zones may blur into each other with some level of gradation (a "soft" interface).

The coatings A, B, and C discussed above may be homogenous substances deposited onto the surfaces of the optical elements in their respective zones, or may comprise layers of different substances. The materials and thicknesses of the coatings, i.e., the "recipes," may be chosen from among any known coating recipes so long as they conform to the reflectance/transmission requirements for the different types of light, as set forth above.

The optical elements or lenses of the assembly may be made of any materials transparent to the particular wavelengths desired to be viewed using the assembly. Such materials may be chosen from, for example, glass, crystal, plastic, acrylic (e.g., PMMA), polycarbonate, urethane-based pre-polymer, or thiourethane.

Although the individual zonally coated optical elements may be more costly than standard optical elements, the simplicity of their mounting into a single, short tube provides savings in assembly time. Moreover, the significantly lower weight, complexity, and volume provide large savings in packaging. Consequently, the total manufactured cost of a dual field-of-view system implementing the zonally coated optical triplet described herein may be a fraction of the cost of manufacturing a prior-art dual FOV system. Furthermore, the described system can be used in applications where the weight and volume of prior-art systems render them unusable. Especially in unmanned aerial vehicle (UAV) or micro air vehicle (MAV) applications, for example, bulk and weight are prime considerations.

The shapes and sizes of the optical elements used in the described lens assembly can be tailored to the specific application. In the example illustrated in FIGS. 1-4, the first or outer or input optical element 1 is a plano-convex lens with a concave central region 32 on the input surface 20. The second or middle or intermediate optical element 2 is a concave-convex lens and may be a slightly negative meniscus lens. The third or inner or output optical element 3 is a concave-convex meniscus lens with a concave central region 48 on the output surface 30.

Although only three optical elements have been illustrated, a person skilled in the art will appreciate that the lens assembly may comprise more than three optical elements. In the simplest arrangements having more than three optical elements, one or more additional optical elements may be present on either side of the triplet, wherein the additional element(s) either have no magnification effect or effect both the WFOV and the NFOV in equivalent ways (e.g., widening both fields of view, or narrowing both fields of view). Such optical elements may be lenses, filters, or other components. Different arrangements based on the same zonal coating principle could permit for differently proportioned dual fields of view or, conceivably, more than two fields of view (e.g., wide, narrow, extremely narrow). In such cases multiple additional lenses could be used, appropriately coated to result in the desired catadioptric reflection pattern necessary to produce the multiple fields of view.

By way of summarizing the above, the three optical elements 1, 2, 3 may be joined as substantially a single optical piece such that mechanical motion between the elements is prohibited. The first optical element 1 may mate with the second optical element 2 at their adjoining surfaces 22, 24 and the second optical element 2 may mate with the third optical element 3 at their adjoining surfaces 26, 28 with essentially no gaps between the elements. That is to say, the second and third surfaces 22, 24 may be mated such that there is substantially no gap between the first and second optical elements 1, 2, and the fourth and fifth surfaces 26, 28 may be mated such that there is substantially no gap between the second and third optical elements 2, 3. The three optical elements 1, 2, 3 may be joined as substantially a single optical piece such that mechanical motion between the elements is prohibited. This also means that the two different fields of view may be provided without requiring moving parts that move the three optical elements forming the six optical surfaces with respect to each other.

Consequently, one or more filter elements may be configured to make light in the WFOV light path distinct from light in the NFOV light path by, for example, spectrum or by polarization. The total length of the NFOV light path 6 may be, for example, no more than 1.5 times the aperture of the narrow field of view. At least the first 20, third 24, fourth 36, and sixth 30 surfaces may be zonally coated to provide the refractive first light path 4 and the reflective second light path 6. In some examples, there is at least a 6.7× difference between the WFOV and the NFOV. In some examples, the three optical elements 1, 2, 3 forming the six optical surfaces 20, 22, 24, 26, 28, 30 do not move with respect to each other, either axially or by translation of any of the elements.

Figure 5A:
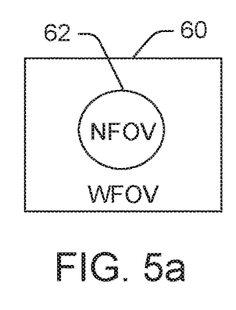
FIGS. 5a and 5b show an example field-of-view filter pattern for use in an airborne ground guidance with targeting application.
Figure 5B:
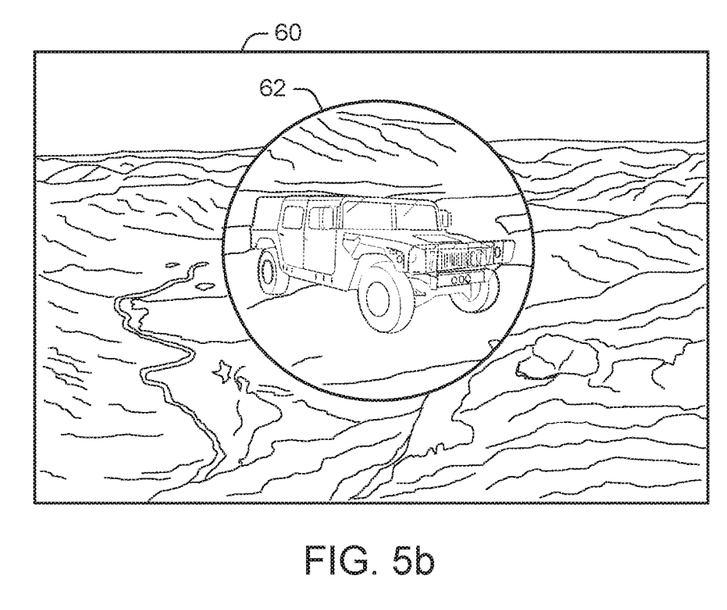
Figure 6A:
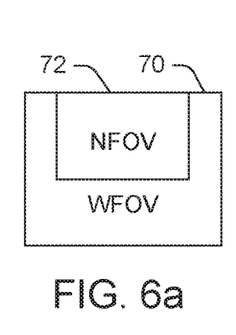
FIGS. 6a and 6b show an example field-of-view filter pattern for use in an automotive application.
Figure 6B:
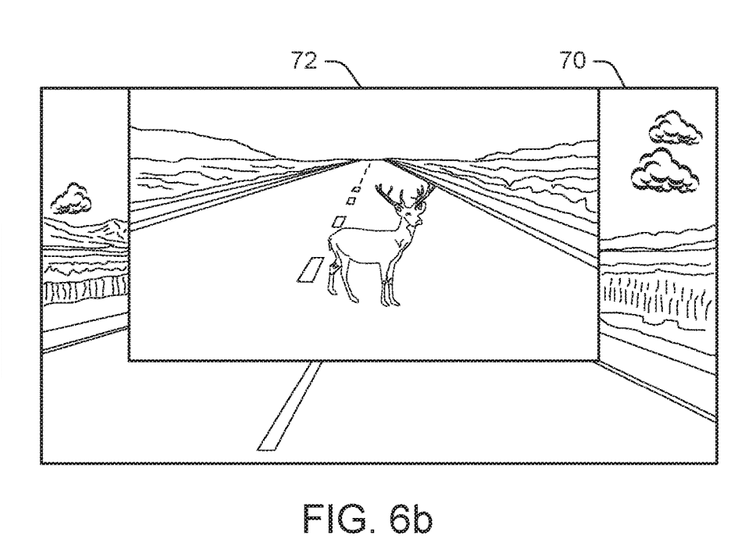

Different applications may call for different filter patterns at the output of the lens assembly, as processed by, for example, the aforementioned detector assembly or imaging sensor. FIGS. 5-6 demonstrate example field-of-view filter patterns for use in different applications. FIGS. 5a-5b show an example of a centered elliptical filter pattern suitable for providing airborne ground guidance with targeting when the lens assembly is provided in an aerial vehicle. The WFOV 60 is available for ground feature guidance while the NFOV 62 is available for targeting. In the illustrated example, a distant enemy vehicle is shown magnified in circularly filtered NFOV 62 while the wider landscape, including features useful for vision-based navigation, is visible in WFOV 60. Whether filtered by the illustrated pattern or not, the WFOV can be provided to a ground feature guidance system in the aerial vehicle while the NFOV can be provided to a targeting system.

Similarly, FIGS. 6a and 6b show an example of a rectangular filter pattern suitable for use in a driver-assist or driverless automotive application when the lens assembly is provided in a road vehicle. For example, the car's lane detection systems can use the WFOV 70 while the car's obstruction detection systems can use the NFOV 72. In the illustrated example, a distant deer that threatens an imminent collision is shown magnified in rectangularly filtered NFOV 72 while the wider landscape, including road edges and markers, are visible in WFOV 70.

The described examples provide uniaxial dual FOV without requiring axial or translation movement of the lenses. Systems with axial translation, such as camcorder zoom lenses, move the lens elements with respect to each other along the same path that the light travels. Systems with translation movement bring lenses or lens portions into and out of the path of light by laterally translating the optical elements.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

I claim:

1. An optical triplet comprising:
three lenses arranged uniaxially, the space between each lens being less than the width of any of the lenses,
wherein the optical triplet is configured to simultaneously output two different fields of view selectable by type of light.

2. The optical triplet of claim 1, wherein the space between each lens is less than 10 millimeters.

3. The optical triplet of claim 1, wherein the two different fields of view are selectable by spectrum.

4. The optical triplet of claim 3, further comprising one or more filter elements configured to make light in a first light path corresponding to a wide field of view of the two different fields of view distinct in spectrum from light in a second light path corresponding to a narrow field of view of the two different fields of view.

5. The optical triplet of claim 4, wherein the total length of the second light path is no more than 1.5 times the aperture of the narrow field of view.

6. The optical triplet of claim 1, wherein the two different fields of view are selectable by polarization.

7. The optical triplet of claim 6, further comprising one or more filter elements configured to make light in a first light path corresponding to a wide field of view of the two different fields of view distinct in polarization from light in a second light path corresponding to a narrow field of view of the two different fields of view.

8. The optical triplet of claim 7, wherein the total length of the second light path is no more than 1.5 times the aperture of the narrow field of view.

9. The optical triplet of claim 1 coupled to an imaging sensor and provided in a road vehicle having a lane detection system and an obstruction detection system, wherein the imaging sensor resolves the two different fields of view as a wide field of view and a narrow field of view, and the wide field of view is provided to the lane detection system while the narrow field of view is simultaneously provided to the obstruction detection system.

10. The optical triplet of claim 1 coupled to an imaging sensor and provided in an aerial vehicle having a ground feature guidance system and a targeting system, wherein the imaging sensor resolves the two different fields of view as a wide field of view and a narrow field of view, and the wide field of view is provided to the ground feature guidance system while the narrow field of view is simultaneously provided to the targeting system.

11. The optical triplet of claim 1, wherein the three lenses are joined as substantially a single optical piece such that mechanical motion between the lenses is prohibited.

12. The optical triplet of claim 11, wherein a first of the three lenses mates with a second of the three lenses at their adjoining surfaces and the second of the three lenses mates with a third of the three lenses at their adjoining surfaces with essentially no gaps between the first, second, and third lenses.

13. A lens assembly simultaneously providing two different fields of view of the same perspective, the assembly comprising:
at least three uniaxially-arranged optical elements forming at least six optical surfaces configured to simultaneously refract or reflect light from at least a first light path corresponding to a wide field of view and a second light path corresponding to a narrow field of view, wherein a first optical element comprises
a first surface coated in a central region with a first coating transmissive of the first light path and reflective of the second light path and coated in an annular outer region with a second coating transmissive of the second light path and reflective of the first light path, and
a second surface transmissive of both the first light path and the second light path;
a second optical element comprises a third surface coated in a central region with the first coating and not coated with the first coating in an annular outer region, and a fourth surface coated in an annular outer region with the first coating and not coated with the first coating in a central region;

and a third optical element comprises a fifth surface, and a sixth surface coated in a central region with the second coating and not coated with the second coating in an annular outer region.

14. The lens assembly of claim 13, wherein the assembly is integrated such that the two different fields of view are provided simultaneously and no moving parts move the three optical elements forming the six optical surfaces with respect to each other.

15. The lens assembly of claim 14, wherein the first optical element is mated with the second optical element at the interface between the second and third surfaces, which adjoin such that there are essentially no gaps between them, and wherein the second optical element is mated with the third optical element at the interface between the fourth and fifth surfaces, which adjoin such that there are essentially no gaps between them.

16. The lens assembly of claim 15, wherein the total length of the second light path is no more than 1.5 times the aperture of the narrow field of view.

17. The lens assembly of claim 16, wherein there is at least a 6.7× difference between the wide field of view and the narrow field of view.

18. The lens assembly of claim 13, wherein the coatings are configured to filter light by polarization or by spectrum.

19. The lens assembly of claim 13 coupled to an imaging sensor and provided in a road vehicle having a lane detection system and an obstruction detection system, wherein the imaging sensor resolves the two different fields of view as the wide field of view and the narrow field of view, and the wide field of view is provided to the lane detection system while the narrow field of view is simultaneously provided to the obstruction detection system.

20. The lens assembly of claim 13 coupled to an imaging sensor and provided in an aerial vehicle having a ground feature guidance system and a targeting system, wherein the imaging sensor resolves the two different fields of view as the wide field of view and the narrow field of view, and the wide field of view is provided to the ground feature guidance system while the narrow field of view is simultaneously provided to the targeting system.

* * * * *